Nov. 17, 1936.  W. FILLINGER  2,061,147
FLUID BRAKE
Filed Nov. 20, 1934
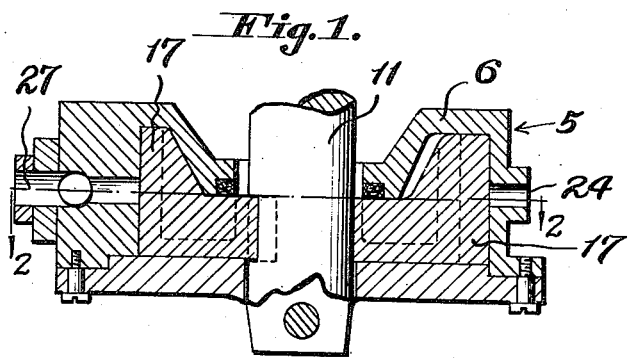
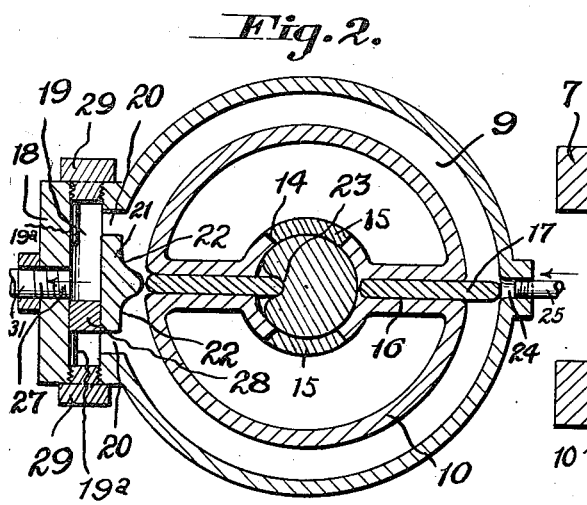
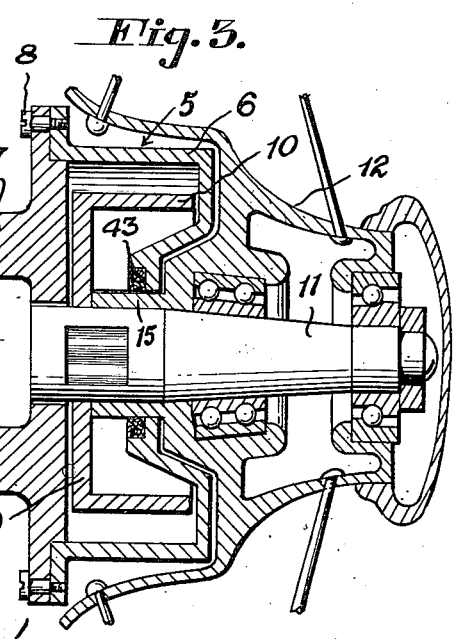
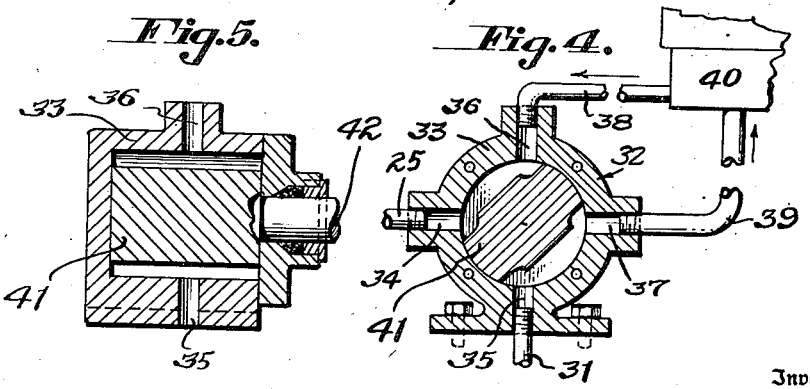
Inventor:
W. Fillinger
By: Glascock Downing & Seebold
Attorney Patented Nov. 17, 1936

2,061,147

UNITED STATES PATENT OFFICE 2,061,147

FLUID BRAKE

William Fillinger, Sao Paulo, Brazil

Application November 20, 1934, Serial No. 753,970

6 Claims. (Cl. 188—90)

This invention relates to improvements in braking devices for vehicles and is particularly adapted for use in connection with motor vehicles.

The object of the invention is the provision of a brake in which the braking action is performed smoothly and gradually and by means of which the movement of the rotating element may be entirely arrested.

A further object of the invention is the provision of a brake which is of simple and inexpensive construction and positive and reliable in operation.

In the accompanying drawing:

Figure 1 is a diametrical section of the improved brake.

Fig. 2 is a section on the line 2—2 of Fig. 1.

Fig. 3 is a section similar to Fig. 1 taken at right angles thereto and illustrating a portion of a vehicle wheel.

Fig. 4 is a transverse section of the control valve showing a fragment of a fluid reservoir, and Fig. 5 is a long section of the valve.

Referring to the drawing in detail the numeral 5 indicates the casing of the brake which is rigidly secured in a suitable manner to the running gear or like part of the vehicle to which the invention is to be applied. The casing 5 includes the cylinder part 6 and the cover part 7, the two parts being rigidly bolted together as indicated at 8 to form a chamber 9 receiving the hollow cylindrical rotor 10.

The vehicle axle 11 is stationary and passes axially through the casing 5 and the rotor 10. The axle rotatably supports the hub 12 of a vehicle wheel. The hub portion 13 of the rotor having the bore therein which receives the axle 11 is provided with opposed recesses 14 receiving key members 15 projecting axially from the wheel hub 12 whereby the rotor 10 and the wheel hub are locked against relative rotary movement.

The rotor 10 is provided with opposed radial slots 16 extending from the bore of the hub 13 to the periphery thereof and receiving slidable blades 17. The outer extremities of the blades 17 move over the inner surface of the cylinder part 6 of the casing and the inner extremities thereof slide over the surface of the axle 11.

The rotor 10 is substantially concentric with the cylinder part of the casing 5 and the latter is enlarged at one side as indicated at 18 to form a valve chamber 19 communicating by passages 20 with the chamber 9. Intermediate the passages 20, a cam element 21 is rigidly mounted in the casing 5 and the opposed faces 22 thereof are adapted to coact with the outer extremities of the blades 17 as the rotor 10 revolves. The portion of the axle 11 disposed in radial alinement with the cam element 21 is formed with a recess 23 permitting the inward movement of the blades 17 when engaged and actuated by the surfaces 22 of the cam 21. After the blades 17 have been thrust inwardly by the cam element 22, the inner extremities thereof moving over the curved surface of the recess 23 will thrust outwardly against the inner surface of the cylinder part 5 and are maintained in engagement therewith by the cylindrical surface of the axle 11.

At the side of the casing 5 opposite the cam element 22 an inlet port 24 is provided therein which communicates with a conduit 25. The outlet 27 for the fluid communicates with the valve chamber 19 and a slide valve 28 is movable longitudinally in the latter between stops 19$^a$ and is adapted, according to its adjustment, to close communication between one or other of the passages 20 and the outlet 27.

The passage 19 is constituted by a bore formed in the enlargement 18 and the ends thereof are closed by screw plugs 29 which, when removed, afford access to the chamber 19 and to the slide valve 28 located therein for purposes of cleaning and adjustment.

The outlet port 27 is connected with the return pipe 31.

The control valve is designated generally at 32 and includes a casing 33 having ports 34 and 35 therein adapted to communicate, respectively, with the conduits 25 and 31. Two additional ports 36 and 37 are formed in the valve casing 33 and communicate by conduits 38 and 39, respectively, with a reservoir 40 containing a supply of oil or other fluid to be used for producing the braking effect. A rotatable valve member 41 having a stem 42 is rotatably mounted in the casing 33 and by adjustment thereof communication between the passages 34 and 36 and the passages 35 and 37 may be regulated as desired.

It will be understood that the rotor 10 is fitted in a fluid-tight manner at one side against the cover part 7 and at the other side against the cylinder part 6, a gasket 43 being provided in the casing part 6 to provide a fluid-tight joint between the latter and the hub 13 of the rotor and the keys 15 of the wheel hub 12.

In operation when the valve 33 is in the position of adjustment illustrated in the drawing, open communication is established between the reservoir 40 and the chamber 9 through one of the passages 20 and as the rotor 10 is rotated with the wheel hub 12 the fluid compressed by the moving blades 17 is discharged through the open passage 20, chamber 19 and outlet port 27 to the return conduit 31 through which it is forced to the pasages 35 and 37 and through the conduit 39 to the reservoir 40. From the reservoir 40 the free circulation of the fluid is completed through the conduit 38, ports 36 and 34 and the conduit 25 to the inlet port 24. Upon reversal of movement of the wheel hub 12, the slide valve 28 is automatically moved toward the opposite end of chamber 19 by the fluid pressure so that circulation of the flow is through the other passage 20. By suitably adjusting the valve member 41 the areas of the ports 34 to 36 may be varied and the resistance to the flow of the fluid induced by the rotor 10 may be varied as desired so as to produce any degree of braking effect on the wheel hub 12. By turning the valve member 41 to a suitable position communication between the conduits 25 and 31 is completely shut off and the movement of the rotor and the wheel hub 12 coupled therewith is stopped.

The invention may be used as a motor drive for vehicle wheels and in this case motive fluid is supplied by a pipe connected with one or the other end of the chamber 19, both plugs 29 being removed and the pipes 25 and 31 being closed by the valve 41.

What I claim is:

1. A braking device comprising a cylinder element and a rotor element, a wheel connected with one of said elements, an axle passing through the cylinder and rotor elements, blades slidable in said rotor and engaging the inner surface of the cylinder, a valve controlled inlet port in the cylinder element, an outlet port in the cylinder element, a cam element fixed with relation to the cylinder element and coacting with the blades, the inner ends of the blades having a sliding fit on the outer surface of the axle and the latter having a recess in the portion thereof opposite said cam element, said cylinder having passages on opposite sides of the cam element leading to the outlet port and valve means controlling communication between the passages and said outlet port.

2. A braking device comprising a cylinder element and a rotor element, a wheel connected with one of said elements, an axle passing through the cylinder and rotor elements, blades slidable in said rotor and engaging the inner surface of the cylinder, valve controlled inlet and outlet ports in the cylinder element, a chamber communicating with said outlet port, plugs removably closing the terminals of said chamber, a cam element fixed in the cylinder element and coacting with the blades of the rotor, said cylinder having passages at either side of the cam element communicating with said chamber, and valve means located in said chamber and controlling communication between said passages and said outlet port.

3. A braking device comprising a cylinder element and a rotor element, a wheel connected with one of said elements, an axle passing through the cylinder and rotor elements, blades slidable in said rotor and engaging the inner surface of the cylinder, valve controlled inlet and outlet ports in the cylinder element, a chamber communicating with said outlet port, a cam element fixed in the cylinder element and coacting with the blades of the rotor, said cylinder having passages at either side of the cam element communicating with said chamber, and freely movable valve means located in said chamber operated by fluid pressure in dependence on the direction of movement of the rotor and controlling communication between said passages and said outlet port.

4. A brake device comprising a cylinder element and a rotor element, a wheel connected with one of said elements, an axle passing through the rotor, blades movably mounted in said rotor and engaging said cylinder, said cylinder having inlet and outlet ports therein, a chamber in communication with one of said ports, said cylinder having passages communicating with the opposite extremities of said chamber, an abutment in said cylinder located between said passages, and a freely movable valve located in said chamber and operated by fluid pressure for controlling communication between said passages and the port communicating with said chamber.

5. A brake device as claimed in claim 4 characterized by the provision of means for limiting the movement of said valve means.

6. A braking device comprising a cylinder element and a rotor element, a wheel connected with one of said elements, an axle passing through the cylinder and rotor elements, blades slidable in said rotor and engaging the inner surface of the cylinder element, said cylinder element having spaced ports therein, a cam element located between said ports and adapted to engage and move the blades inwardly during rotation of the rotor element, said blades being engaged at their inner ends with said axle whereby they are maintained in engagement with the inner surface of the cylinder element throughout the major portion of the rotary movement thereof, said axle having a recess adapted to accommodate the ends of said blades when the latter are moved inwardly by said cam element.

WILLIAM FILLINGER.